R. H. THURSTON.
Machine for Testing Lubricating Oils.

No. 134,229.  Patented Dec. 24, 1872.

WITNESSES,
Thos. J. Shearman
Robt. H. Blanding

INVENTOR,
R. H. Thurston

UNITED STATES PATENT OFFICE.

ROBERT H. THURSTON, OF HOBOKEN, NEW JERSEY.

IMPROVEMENT IN MACHINES FOR TESTING LUBRICATING OILS.

Specification forming part of Letters Patent No. 134,229, dated December 24, 1872.

*To all whom it may concern:*

Be it known that I, ROBERT H. THURSTON, of Hoboken, in the county of Hudson, State of New Jersey, have invented certain Improvements in Machines for Testing Lubricating-Oils, of which the following is a specification:

My invention relates to that class of machines in which lubricating oils are tested by placing them upon a journal arranged for the purpose, and there submitting them to pressure and to a velocity of motion of rubbing surfaces approximating, as closely as may be possible or convenient, to the pressure and velocity of the surfaces upon which they are expected to be used, while at the same time the consequent elevation of temperature is observed by means of a properly-attached thermometer, and the time is noted from the application of the lubricant to its decomposition or to the drying of the rubbing surfaces. The object of my invention is to subject the oil under test to a pressure without throwing that pressure upon the bearings of the machine itself, and in such manner, also, that as little heat shall be conveyed away from the thermometer to other parts of the machine as is possible; and, further, to obtain simultaneously a thermometrical and a dynamometrical test of the lubricant.

Figure 1:
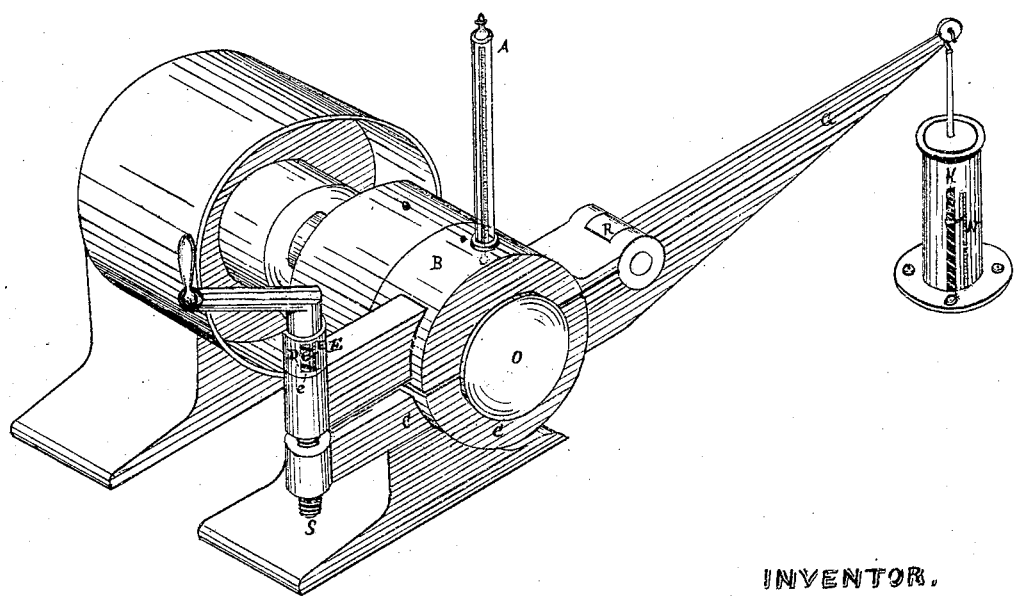

Figure 1 is an isometrical view of my machine.

A is the thermometer, which indicates the rapidity of heating of the journal. It is inserted in the cap-brass B of the journal made on the shaft O O; and the two brasses are so made as to form a clamp, B C R, by which means the pressure is applied without the use of weights, and without bearing upon the bearings which support the shaft. A screw, S, is used to adjust the pressure of the clamp on the journal, the action of the screw being resisted by a spiral spring, as in Fig. 1, or plate spring, as in Fig. 2; and the degree of such pressure is indicated by a scale or index, E.

Without this pressure gaging and indicating apparatus there could be no reliable or satisfactory application of the arm or lever G, scale N, and spring K, whose readings and indications yield the desired or corroborative dynamometrical test.

Figure 3:
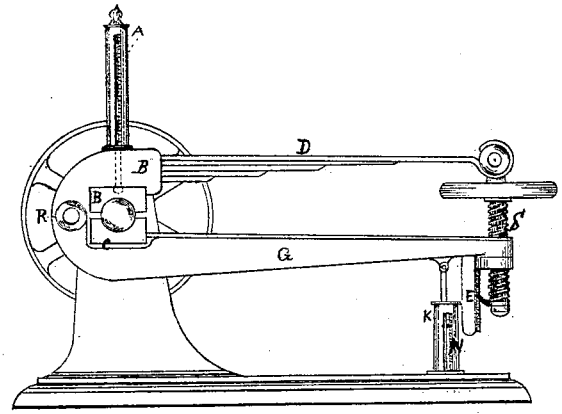
Figure 2:
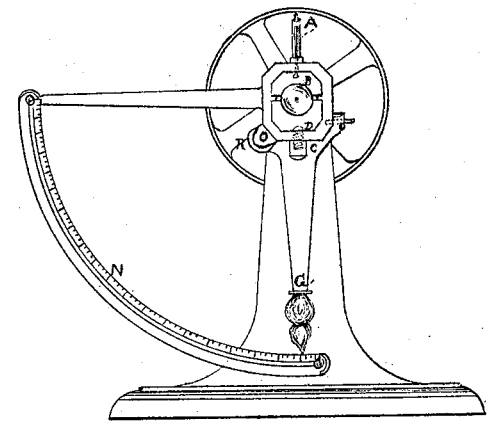

The machine shown in Fig. 2 is designed for light work, and that in Fig. 3 for very heavy pressure.

What I claim is—

The combination of the clamp B C, journal O, screw S, spring D, index E, thermometer A, lever G, and index K N, as described, for the purpose of indicating and gaging the pressure on said journal, and indicating the degree of resultant friction and heat, as specified.

ROBERT H. THURSTON.

Witnesses:
   HENRY MORTON,
   C. W. MACCORD.